United States Patent
Lorenz et al.

(10) Patent No.: US 8,275,484 B2
(45) Date of Patent: Sep. 25, 2012

(54) STEPPER MOTOR GAS VALVE AND METHOD OF CONTROL

(75) Inventors: Thomas B. Lorenz, St. Louis, MO (US); David L. Perry, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 417 days.

(21) Appl. No.: 12/729,716

(22) Filed: Mar. 23, 2010

(65) Prior Publication Data

US 2010/0179700 A1    Jul. 15, 2010

Related U.S. Application Data

(60) Provisional application No. 61/228,474, filed on Jul. 24, 2009.

(51) Int. Cl.
G05D 7/00 (2006.01)
G05D 23/20 (2006.01)
F25D 23/12 (2006.01)
F24H 9/20 (2006.01)
F16K 21/04 (2006.01)

(52) U.S. Cl. ......... 700/282; 165/267; 236/11; 236/46 E; 251/30.01

(58) Field of Classification Search .................. 700/282; 236/1, 11, 46; 165/267; 251/30.01
See application file for complete search history.

(56) References Cited

U.S. PATENT DOCUMENTS

| | | | |
|---|---|---|---|
| 3,785,432 A | 1/1974 | Kabat et al. | 165/22 |
| 4,425,930 A | 1/1984 | Kruto | 137/1 |
| 4,976,459 A | 12/1990 | Lynch | 236/11 |
| 5,022,460 A | 6/1991 | Brown | 165/12 |
| 5,115,968 A | 5/1992 | Grald | 236/78 D |
| 5,271,556 A | 12/1993 | Helt et al. | 236/11 |
| 5,340,028 A | 8/1994 | Thompson | 236/10 |
| 5,410,230 A | 4/1995 | Bessler et al. | 318/471 |
| 5,732,691 A | 3/1998 | Maiello et al. | |
| 5,806,760 A * | 9/1998 | Maiello | 236/11 |
| 6,230,979 B1 * | 5/2001 | Vendt et al. | 236/11 |
| 6,244,515 B1 * | 6/2001 | Rowlette et al. | 236/1 E |
| 6,370,894 B1 | 4/2002 | Thompson et al. | 62/158 |
| 6,450,409 B1 | 9/2002 | Rowlette et al. | 236/1 E |
| 6,705,342 B2 | 3/2004 | Santinanavat et al. | 137/489 |
| 6,826,917 B1 | 12/2004 | Bodell, II et al. | 62/115 |
| 6,925,999 B2 | 8/2005 | Hugghins et al. | 126/116 A |
| 7,293,718 B2 | 11/2007 | Sigafus et al. | |
| 7,731,096 B2 | 6/2010 | Lorenz et al. | 236/1 C |
| 2003/0029924 A1 * | 2/2003 | Kloster | 236/11 |

(Continued)

*Primary Examiner* — John R. Cottingham
*Assistant Examiner* — Darrin Dunn
(74) *Attorney, Agent, or Firm* — Harness, Dickey & Pierce, P.L.C.

(57) ABSTRACT

A controller for a variable heating system is operable to control a stepper motor operated gas valve to adjust gas flow to vary the heating level. The controller includes a first terminal for receiving a thermostat signal requesting heating, an electronic memory, and a microprocessor in communication with the electronic memory and first terminal. The microprocessor detects a thermostat signal requesting heating, and generates a control signal for the stepper motor to operate the gas valve. The microprocessor includes a programmable read-only-memory encoded with an instruction to store a time duration during which the microprocessor detects a thermostat signal requesting heating, and further encoded with an instruction operable to determine a predetermined heating level based on the stored time duration. The microprocessor responds to a thermostat signal requesting heating by determining the number of steps the motor must move to vary the gas flow corresponding to the predetermined heating level.

21 Claims, 5 Drawing Sheets

U.S. PATENT DOCUMENTS

| | | | |
|---|---|---|---|
| 2004/0075660 A1 | 4/2004 | Liao et al. | 345/441 |
| 2005/0092317 A1* | 5/2005 | Hugghins et al. | 126/116 A |
| 2009/0127346 A1 | 5/2009 | Grohman | |
| 2010/0009302 A1 | 1/2010 | Nordberg et al. | |

* cited by examiner

STEPPER MOTOR GAS VALVE AND METHOD OF CONTROL

CROSS-REFERENCE TO RELATED APPLICATIONS

This application claims the benefit of U.S. Provisional Application No. 61/228,474, filed on Jul. 24, 2009. The entire disclosure of the above application is incorporated herein by reference.

FIELD

The present disclosure relates to systems for control of an appliance incorporating a flame, and more particularly relates to valve control of a fuel to such an appliance.

BACKGROUND

The statements in this section merely provide background information related to the present disclosure and may not constitute prior art.

There are two types of commonly available, gas-fired, warm air furnaces in the marketplace: those with a single gas flow rate, and those with two or more gas flow rates. These are referred to as single and multistage furnaces, respectively. Multistage furnaces are frequently selected by homeowners for replacement furnaces because they offer increased performance and comfort. In retrofit applications there is typically an existing single stage thermostat and wiring in place. It can be troublesome to install a multistage thermostat in a retrofit application when a single stage thermostat is already in place because of the need to route additional wiring through walls for the additional stages. For simple and economical installation, it is desirable to be able to continue to use a single stage thermostat and thermostat wiring when replacing a single stage furnace with a multistage furnace.

Several attempts have been made to allow a single stage thermostat to work with multi-stage furnaces. In some multistage furnaces, the furnace control switches from a low heating level to a full capacity heating level after some pre-set time has expired, regardless of the level of heating actually required at the time. Accordingly, a need still exists for an improved control of variable stage heating systems.

SUMMARY

Further areas of applicability will become apparent from the description provided herein. It should be understood that the description and specific examples are intended for purposes of illustration only and are not intended to limit the scope of the present disclosure.

Various embodiments of a controller for a variable output heating apparatus are provided, which may be connected to either a single stage or a two-stage thermostat. One embodiment of a controller for a variable heating system is operable to control a stepper motor operated gas valve configured to adjust a gas flow rate to vary the level of heating operation. The controller includes a first terminal configured to receive a thermostat signal requesting heating operation, an electronic memory, and a microprocessor in communication with the electronic memory and the first terminal. The microprocessor is configured to detect the presence of a thermostat signal requesting heating at the first terminal, and to generate a control signal for the stepper motor operated gas valve to operate the gas valve for establishing heating operation. The microprocessor includes a programmable read-only-memory encoded with an instruction to store in the electronic memory a time duration during which the microprocessor detects the presence of a thermostat signal requesting heating, and further encoded with an instruction operable to determine a predetermined heating level based on the stored time duration. The microprocessor is configured to respond to the detection of a thermostat signal requesting heating by determining the number of steps the stepper motor must move to adjust the gas valve to a gas flow rate corresponding to the predetermined heating level. The microprocessor responsively generates a control signal corresponding to the determined number of steps for the stepper motor to adjust the gas valve to the gas flow rate corresponding to the predetermined heating level.

In another aspect of the present disclosure, various controllers may be utilized in combination with a stepper-motor controlled gas valve having a main diaphragm in a main diaphragm chamber that controllably displaces a valve element relative to a valve opening. The main diaphragm displaces the valve element in response to changes in pressure in the main diaphragm chamber, to thereby adjust the flow of fuel through the valve opening. The stepper-motor operated gas valve further includes a servo-regulator diaphragm configured to regulate fluid flow to the main diaphragm chamber, which flow acts against the main diaphragm to adjust the valve and vary the rate of fuel flow therethrough. The stepper motor is configured to move in a stepwise manner to displace the servo-regulator diaphragm for regulating fluid flow to the diaphragm chamber, to adjust the valve and thereby vary the rate of fuel flow through the valve.

Further areas of applicability will become apparent from the description provided herein. The description and specific examples in this summary are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
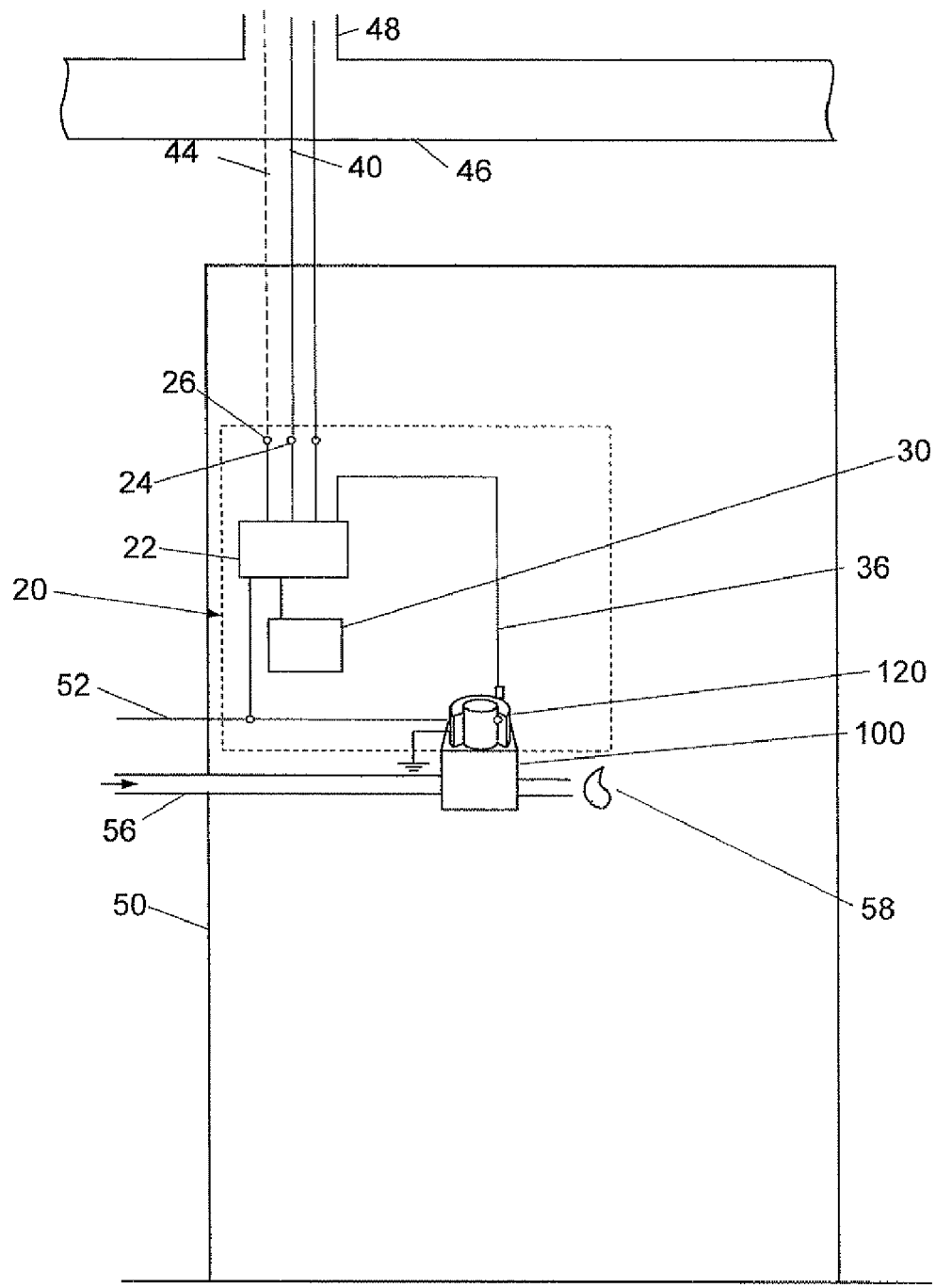
FIG. 1 is a schematic diagram showing one embodiment of a controller for a two-stage heat source according to the principles of the present disclosure.

The following description is merely exemplary in nature and is not intended to limit the present disclosure, application, or uses. It should be understood that throughout the drawings, corresponding reference numerals indicate like or corresponding parts and features.

In the various embodiments of the present invention, a controller for a variable heating apparatus is provided that is adapted to be connected to either a single stage or a two-stage thermostat. In one embodiment shown in FIG. 1, a controller 20 is provided that comprises a microprocessor 22 and a first terminal 24 for receiving a signal requesting heating from a single-stage thermostat that may be connected to the first terminal 24 via wire 40. When replacing a single stage furnace with a variable heating capacity furnace 50, it is desirable to be able to use an existing installed single stage thermostat and existing wiring, because of the cost associated with routing additional wiring through flooring 46 and walls 48 for the additional stages. The present controller 20 provides for control of a variable heating capacity furnace using the existing single stage thermostat, based on the "request for heat" signal from the existing thermostat. When a request for heat signal from a thermostat is received at the first terminal 24, the controller 20 controls the stepper motor to operate the gas valve to establish initial operation of the heating system. Thereafter, the controller 20 is configured to detect a thermostat signal requesting heating operation, and to determine a predetermined heating level based on a time period in which a signal at the first terminal 24 was present in a prior heating cycle, to thereby adjust the level of heating operation depending on the heating demand.

Referring to FIG. 1, the controller or control circuit 20 is coupled to a 24-volt power source 52, which supplies power to a microprocessor 22 and also a stepper motor operated gas valve 100. The controller or control circuit 20 further includes a first terminal 24 configured to receive a thermostat signal requesting heating operation via connection wire 40. Upon detecting the presence of a thermostat signal requesting heating operation at terminal 24, the microprocessor 22 is configured to communicate a control signal via 36 to the stepper-motor operated gas valve 100 to establish low stage heating operation at a burner 58. The controller 20 may further include a second terminal 26 configured to receive a thermostat signal via 44 requesting high-stage heating. Upon detecting a thermostat signal requesting high stage heating operation, the microprocessor 22 is configured to communicate a control signal via 36 to the stepper-motor operated gas valve 100 to supply gas via line 56 for establishing a higher level of heating at a burner 58. The control circuit 20 is also configured to operate the variable capacity heating apparatus between a minimum and maximum heating capacity depending on heating demand, as explained below.

Upon start-up of the heating apparatus or system, the microprocessor 22 of the controller may be configured to control the initial operation of a variable capacity heating apparatus to provide a low heating level operation (such as 40-65 percent of heating capacity). This initial low heating level may be operated for a variable time period that is based on heating demand, where the variable time period may be varied based on a duty cycle value indicative of heating demand, which is determined as follows. The controller 20 includes a microprocessor 22 in communication with the first terminal 24, which accordingly can detect the presence of a thermostat signal requesting heating operation at the first terminal 24. The microprocessor 22 includes a programmable read-only memory encoded with an instruction that is operable to store in an electronic memory 30 the duration of time in which the signal at the first terminal 24 is present. The microprocessor 22 may be further configured to calculate a duty cycle value based on the ratio of the duration of time in which a signal requesting or calling for heat is present at the first terminal 24 versus the on and off time of a heating cycle. For example, a duty cycle value of 80 percent is calculated where a 10 minute duration of heating operation was followed by a 2 minute off period before the start of the next heating cycle, to yield 10 minutes on during a 12 minute on-off heat cycle. The microprocessor 22 is configured to determine a low heating level time limit value 28 (shown in FIG. 5) from the calculated duty cycle value. Alternatively, the low heating level time limit value 28 may be a default time period, such as an adjustably set time period of between 10 minutes and 20 minutes. Initially, absent any calculated duty cycle value or first stage time limit value, the microprocessor may use a default time limit value, such as 15 minutes for example.

In the various embodiments, the initial low level of heating operation is maintained until the expiration of the variable time period. Where the variable capacity heating apparatus is first operated (such as after installation or at the beginning of a heating season), when the variable time period expires the heating level is increased to 100% operating capacity. The stepper-motor moves the servo-regulator diaphragm to cause the valve to be fully opened to permit maximum gas flow, which is maintained until the thermostat ceases to signal or call for heating operation, at which point heating operation terminates.

According to another aspect of the present disclosure, the variable capacity heating apparatus may be operated between a minimum and maximum heating capacity depending on a duration of time that the heating system operated in one or more previous heating cycles. The microprocessor 22 includes a programmable read-only memory encoded with an instruction that is configured to determine and store in an electronic memory the duration of time in which the signal at the first terminal 24 is present. The microprocessor's programmable read-only memory is further encoded with an instruction configured to determine a predetermined heating level based on the stored period of time in which a signal was present at the first terminal 24 (e.g., the time that the variable capacity heating apparatus operated in a prior heating cycle). When a thermostat signal requesting heating is detected, the microprocessor 22 is configured to control the stepper motor to adjust the valve to establish the predetermined heating level determined by the microprocessor, to thereby adjust the level of heating operation based on heating demand, as explained below.

After conclusion of the initial heating cycle, the microprocessor 22 is configured to detect the presence of a thermostat signal requesting heating at the first terminal 24. As previously stated, the microprocessor 22 includes a programmable read-only memory encoded with an instruction to store the time duration in which the microprocessor 22 detects the presence of a thermostat signal requesting heating via the first terminal 24. The microprocessor's programmable read-only memory is further encoded with an instruction configured to determine a predetermined heating level based on the stored period of time (e.g., the time that the variable capacity heating apparatus operated in a prior heating cycle). For example, if during an initial heating cycle the heating apparatus operated for a time of six minutes (at which time the thermostat signal to the first terminal 24 was discontinued), the microprocessor 22 includes an instruction that is configured to determine a new predetermined heating level by decrementing the level of heating operation by a predetermined percentage for each minute that the heating apparatus ran less than a threshold time period. The threshold time period may be a nominal operating time, which may in the range of between about 8 minutes to about 20 minutes. If, in this example, the heating apparatus operated for only 6 minutes (4 minutes less than the 10 minute threshold time period), the microprocessor 22 is configured to determine a new predetermined heating level by decrementing the heating level by 5 percent for each minute of operation less than the threshold time period, or percent from the 100% capacity heating level of the prior cycle. Thus, where the heating apparatus was initially operated at 100 percent capacity for six minutes, the next call for heat would result in the heating apparatus operating at 80 percent capacity. If, in the above example, the heating apparatus was operated at 80 percent capacity for seven minutes, at the next call for heat the microprocessor 22 is configured to determine a new predetermined heating level by decrementing the prior heating level by 5 percent for each minute of operation under the threshold time period, i.e., a 15 percent decrease from the 80 percent capacity heating level in the previous cycle. Thus, the next call for heat would result in the heating apparatus operating at a heating level of 65 percent capacity. Likewise, the microprocessor 22 may be configured to increment the level of heating operation in the next heating cycle, by a predetermined percentage for each minute that the heating operation exceeds a threshold time period (such as 10 minutes). If the heating apparatus in the above example were operated at 65% capacity for 13 minutes (3 minutes longer than the 10 minute threshold time period), the microprocessor 22 is configured to determine a new predetermined heating level by incrementing the prior heating level by 5 percent for each minute of operation over the threshold time period, i.e., a 15 percent increase above the heating level from the previous cycle. Thus, the next call for heat would result in the heating apparatus operating at a heating level that is at 80 percent capacity.

The microprocessor 22 may be further configured to increment the level of heating operation by a predetermined percentage whenever the heating apparatus is operated continuously for more than a threshold time period (such as 10 minutes). For example, where the heating apparatus is operated longer than 10 minutes, the microprocessor 22 may increment the level of heating by 20 percent. Where the controller 20 is connected to a two-stage thermostat via the second terminal 26, the microprocessor 22 may be configured to receive a second stage heating signal (from a two-stage thermostat requesting 100 percent heating capacity operation via second terminal 26) and responsive increment the level of heating operation by a predetermined amount (such as 20 percent, for example).

Thus, the microprocessor 22 may be configured to determine a predetermined level of heating based on the duration of time that the heating apparatus was operated in at least one prior heating cycle, and may accordingly adjust the level of heating as needed when heating operation is requested or called for by a thermostat or system control. It should be noted that the microprocessor 22 may be configured to average two or more prior heating cycle time durations, and determine a new level of heating based on the average of two or more heating cycle time durations. For example, the microprocessor 22 may be configured to determine a predetermined level of heating operation based on the following formula:

change to prior capacity=(prior on-time(min)−threshold on-time(min))×5%, where the predetermined level of heating operation is the previous level of heating with the above calculated offset percentage.

Figure 2:
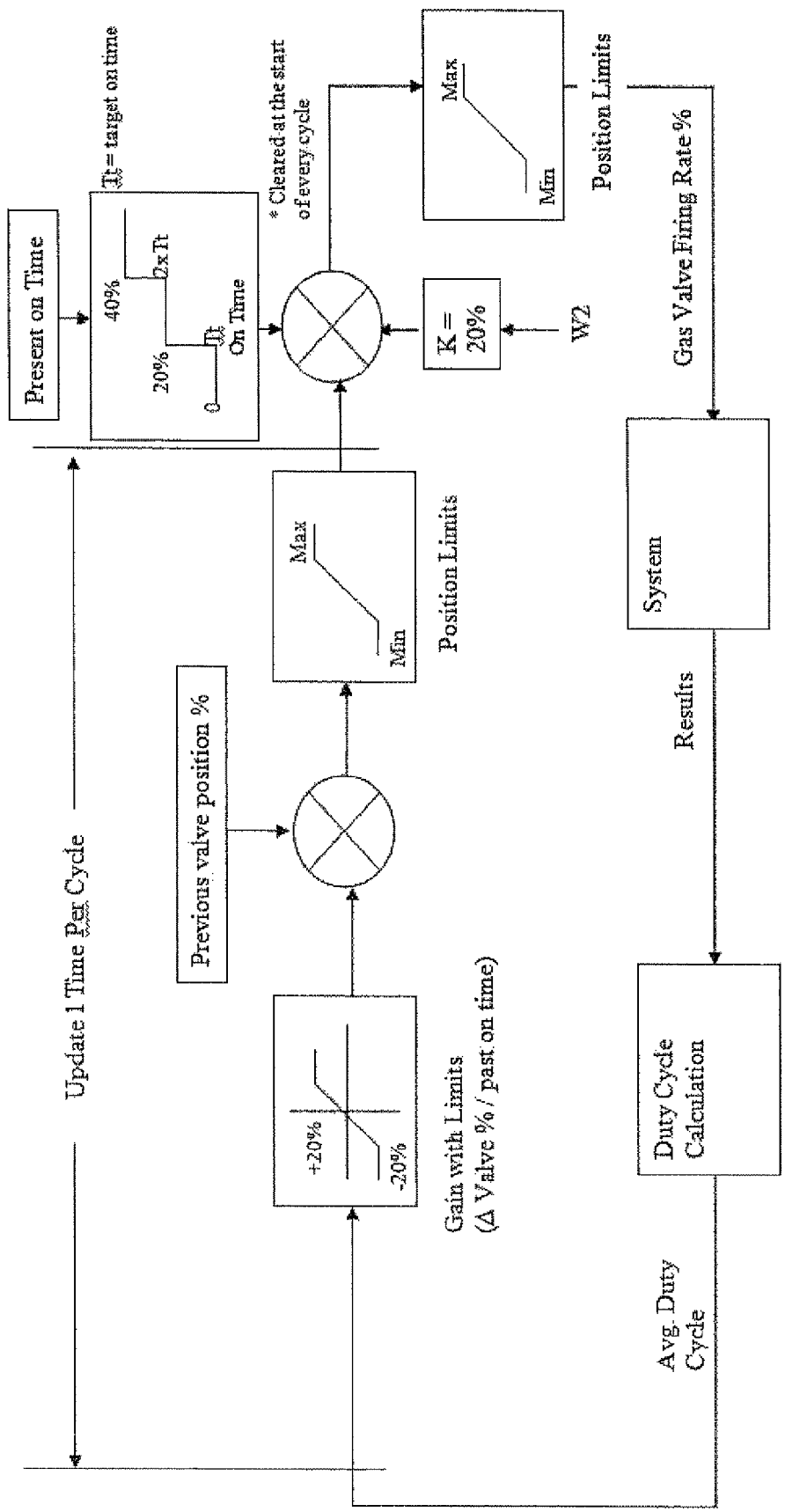
FIG. 2 is a block system diagram illustrating the controller of a stepper motor driven gas valve, according to the present disclosure.

Operation of the controller 20 and microprocessor 22 is shown in the schematic in FIG. 2, which shows the determination of a predetermined heating level or rate of gas flow (within minimum and maximum limits), based on the present on time that the heating apparatus is operated. The controller 20 may also increment the level/rate of operation by 20 percent upon receiving a "W2" second stage signal from a two-stage thermostat via second terminal 26 (see FIGS. 1-2).

Figure 3:
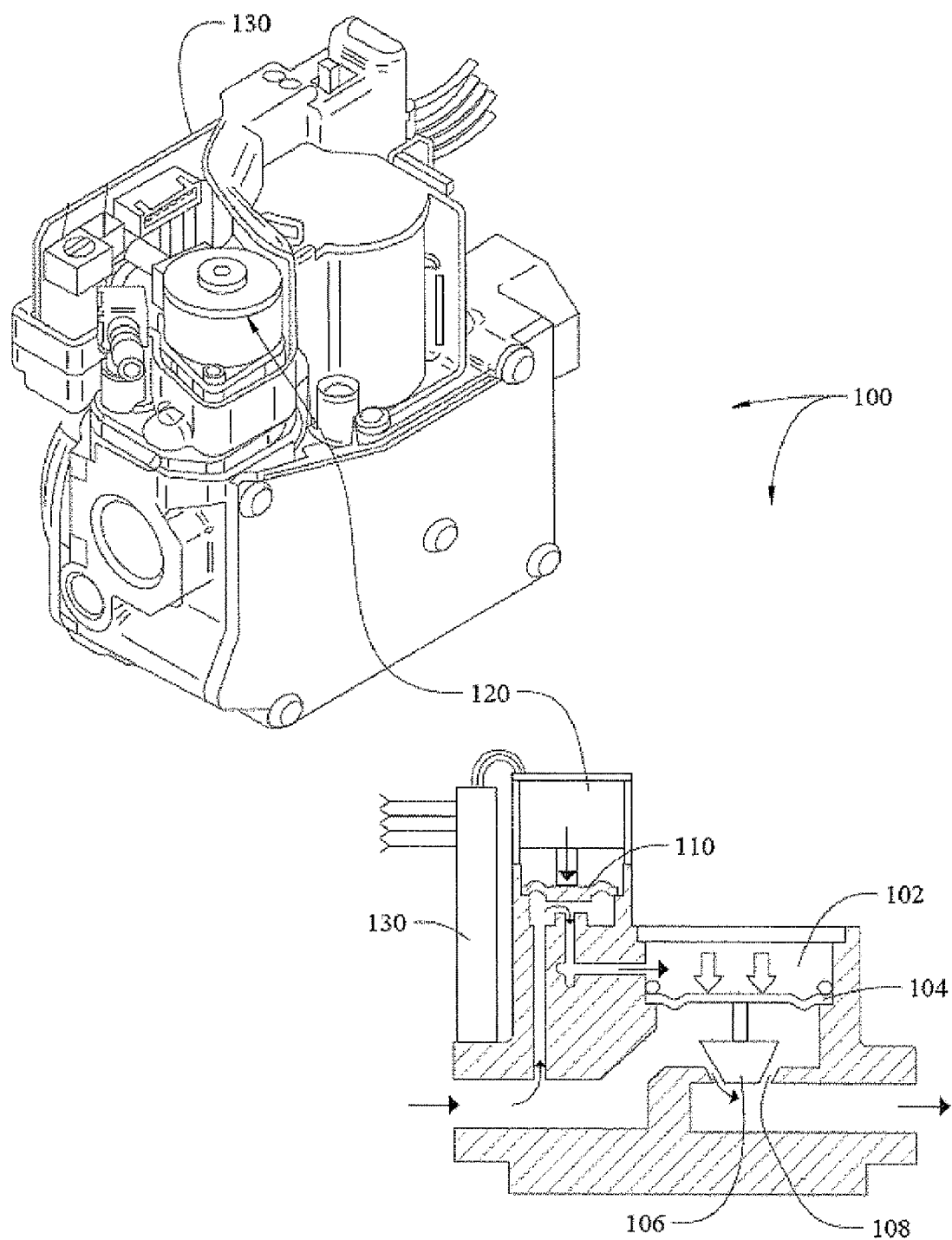
FIG. 3 shows a perspective view and a schematic cut-away view of one embodiment of a stepper-motor operated gas valve controller according to the present disclosure.

Referring to FIG. 3, a stepper-motor operated gas valve 100 is shown. The stepper-motor operated gas valve 100 includes a main diaphragm chamber 102, and a main diaphragm 104 disposed in the main diaphragm chamber 102. The main diaphragm 104 controllably displaces a valve 106 relative to a valve opening 108 in response to changes in pressure in the main diaphragm chamber 102, to thereby permit adjustment of the flow of fuel through the valve opening 108. The stepper-motor operated gas valve 100 further includes a servo-regulator diaphragm 110, which is configured to regulate fluid flow to the main diaphragm chamber 102. The servo-regulator diaphragm 110 therefore controls the fluid pressure applied to the main diaphragm 104, to control the rate of fuel flow through the valve opening 108. The stepper-motor operated gas valve 100 also includes a stepper motor 120 configured to move in a stepwise manner to displace the servo-regulator diaphragm 110, for regulating fluid flow to the diaphragm chamber 102 to thereby regulate the rate of fuel flow through the valve 106.

The stepper-motor accordingly provides control over the extent of opening of the valve 108, to provide modulated fuel flow operation. The first embodiment of a gas valve 100 is governed by a stepper motor 120. The stepper-motor operated gas valve control 100 preferably includes a controller 130 (see control circuit 20 shown in FIG. 1) that includes the microprocessor 22 (shown in FIG. 1). The controller 130 is configured to receive an input control signal via a first terminal 24 requesting heating operation (such as from a thermostat or heating system control).

The microprocessor 22 is configured to determine a select motor step value that corresponds to the predetermined level of heating operation determined based on the prior on-time value, and to move the stepper-motor 120 a number of steps corresponding to the predetermined level of heating operation, which displaces the servo-regulator diaphragm 110 and valve element to thereby control the rate of fuel flow through the valve opening 108. The microprocessor 22 determines the number of steps the motor must turn or move to set the servo-regulator diaphragm 110 to the requested fuel level. The stepper motor gas valve 100 drives the stepper-motor 120 in a step-wise manner, to the predetermined stepper motor position, which causes the stepper-motor 120 to displace the servo-regulator diaphragm the predetermined distance and thereby regulate the output of the valve.

The microprocessor 22 may be configured to initiate operation of a heating apparatus at a low level of heating (such as 65 percent of capacity) for a given initial time period 28 (shown in FIG. 5), after which the microprocessor 22 determines a predetermined heating level that results in incrementing the initial level by 5 percent. After 10 minutes of operation, the microprocessor 22 is configured to increment the level of heating by a predetermined amount (such as 20 percent), which results in operation at 90 percent capacity. After 12 minutes of continuous operation, the thermostat call for heat is discontinued and the heating cycle terminates. At the next call for heat, the microprocessor 22 is configured to determine a value for at least one prior heating cycle duration (which may be the average of two or more cycles), and to increment the prior rate of 70 percent capacity to 90 percent capacity based on the 4 minutes of operation beyond the 10 minute target threshold. On the third call for heat, the microprocessor 22 determines a predetermined level of heating based on a prior heating cycle of 9 minutes, and decrements the 90 percent operation level from the prior cycle by 5 percent to 85 percent.

Figure 4:
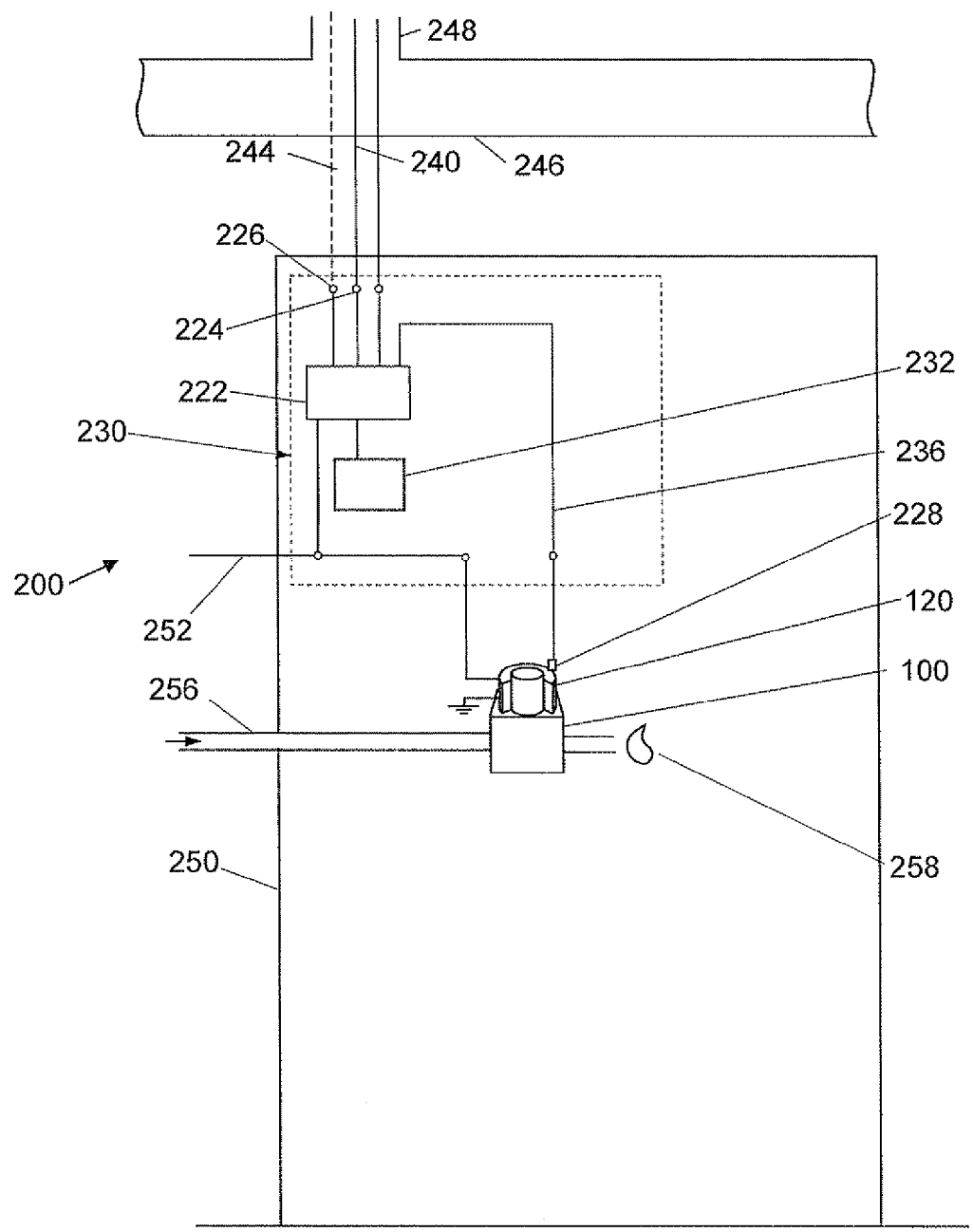
FIG. 4 is a schematic diagram showing a second embodiment of a controller for a variable heating system.

In use, the controller 130 and stepper-motor operated gas valve 100 would be included within a fuel-fired heating system 200 that includes a burner 258 (as shown in FIG. 4), which is supplied with fuel by the stepper-motor operated gas valve 100. The fuel-fired heating system 200 further includes a thermostat (not shown in FIG. 4) that communicates with the system or furnace controller 230 for controlling operation of a stepper-motor operated gas valve.

In the above embodiment, a controller 130 is provided for controlling a stepper motor gas valve, in which the stepper motor, gas valve, and controller 130 are all part of a combined controller and gas valve product that are integrally manufactured or assembled as a unit. It should be understood that the above stepper-motor operated gas valve utilizes a set of motor step values that correspond to a plurality of positions of the stepper motor for adjusting the gas valve, which positions range between a closed no-flow position to a 100% full capacity position. The above described embodiment of a controller 130 and stepper-motor operated gas valve 100 may be employed in combination with a single stage or two-stage thermostat and a burner that is supplied with fuel by the stepper-motor operated gas valve control 100, where the thermostat simply requests initiation of heating and the controller 130 is configured to determine the predetermined heating rate.

Alternatively, in a second embodiment shown in FIG. 4, the control of a variable rate gas valve in accordance with the principles of the present disclosure is provided by a system or furnace controller 230 for controlling a variable rate gas valve of a variable heating system, where the system or furnace controller 230 determines the predetermined heating rate.

Referring to FIG. 4, the system or furnace controller 230 is coupled to a 24-volt power source 252, which supplies power to microprocessor 222 and also a stepper motor operated gas valve 100. The system or furnace controller 230 includes a first terminal 224 configured to receive a thermostat signal requesting heating operation via connection wire 240 passing through the flooring 246 and walls 248 of a space. Upon detecting the presence of a thermostat signal requesting heating operation at terminal 224, the microprocessor 222 is configured to communicate a control signal via 236 to the stepper-motor operated gas valve 100 to establish low stage heating operation at a burner 258. The system or furnace controller 230 may further include a second terminal 226 configured to receive a thermostat signal via 244 requesting high-stage heating. Upon detecting a thermostat signal requesting high stage heating operation, the microprocessor 222 is configured to communicate a control signal via 236 to the stepper-motor operated gas valve 100 to supply gas via line 256 for establishing a higher level of heating at a burner 258. The system or furnace controller 230 is configured to operate the variable capacity heating apparatus between a minimum and maximum capacity depending on demand, as explained below.

In the second embodiment, the system or furnace controller 230 is configured to generate a gas valve control signal that is input to a variable rate gas valve that supplies a burner 258 with fuel. The system or furnace controller 230 may be configured to generate a gas valve control signal in the form of a pulse-width modulating signal or a serial communication signal for controlling either a stepper motor operated gas valve or a modulating solenoid operated gas valve. Where the variable rate gas valve is a stepper motor operated gas valve, the stepper motor operated valve 100 includes a third terminal 228 that receives the control signal generated by the system or furnace controller 230. Alternatively, the control signal may be in the form of a milliamp signal for controlling either a stepper motor operated gas valve or a modulating solenoid operated gas valve. One such example of a modulating gas valve is disclosed in U.S. Pat. No. 6,705,342, the disclosure of which is incorporated herein by reference. Where the variable rate gas valve is a modulating solenoid operated gas valve, the modulating solenoid operated gas valve includes a 'V' terminal that receives the control signal generated by the system or furnace controller 230, and causes a variable valve displacement based on the value of the milliamp signal. In each of the above control signals, the system or furnace controller 230 is configurable to generate a control signal for a select variable rate gas valve that corresponds to a determined predetermined heating level.

Upon start-up of the variable heating system shown in FIG. 4, the microprocessor 222 of the system or furnace controller 230 is configured to detect a thermostat signal requesting heating via an input terminal 224 and to generate a control signal for operating the variable rate gas valve to initial operation of the variable capacity heating apparatus to provide a low heating level operation (such as 40-65 percent of heating capacity). This initial low heating level may be operated until the thermostat signal requesting heating operation is discontinued. As an example, the microprocessor 222 may generate a control signal for operating the variable rate gas valve to establish low heating level operation at 65 percent of heating capacity for a time period of 11 minutes (at which time the thermostat discontinues the signal to input terminal 224).

After the initial heating cycle, the system or furnace controller 230 is configured to respond to subsequent thermostat signals requesting operation in subsequent heating cycles by starting the variable capacity heating apparatus at a low heating level (such as 65 percent of heating capacity) and shortly thereafter generating a control signal to the variable rate gas valve to provide a predetermined heating level that is based on a duration of time that the heating system operated in one or more previous heating cycles, as explained below.

According to one aspect of the present disclosure, the microprocessor 222 includes a programmable read-only memory encoded with an instruction that is operable to determine and store in an electronic memory the duration of time in which the microprocessor 222 detects the presence of a thermostat signal requesting heating operation at the input terminal 224. The microprocessor's programmable read-only memory is further encoded with an instruction operable to determine a predetermined heating level based on the stored time duration in which a thermostat signal was present at the input terminal 224 (e.g., the time that the variable capacity heating apparatus operated in a prior heating cycle). After conclusion of the initial heating cycle, the microprocessor 222 is configured to respond to the detection of a thermostat signal requesting heating at the input terminal 224 by determining a predetermined heating level and generating a corresponding control signal for controlling the variable rate gas valve to adjust the gas flow rate to the predetermined heating level.

As in the previous embodiments, the microprocessor 222 includes a programmable read-only memory encoded with an instruction that is operable to determine a predetermined heating level based on the stored time duration in which a thermostat signal was present at the input terminal 224 (e.g., the time that the variable capacity heating apparatus operated in a prior heating cycle). For example, if in the above example the heating apparatus operated at 65 percent capacity in the initial heating cycle for a time of 11 minutes (after which the thermostat signal to the input terminal 224 was discontinued), the microprocessor's encoded instruction is configured to determine a new predetermined heating level by incrementing the prior level of heating operation by a predetermined percentage for each minute that the heating apparatus ran longer than a threshold time period. The threshold time period may be a nominal operating time, which may in the range of between about 8 minutes to about 20 minutes, and more preferably about 10 minutes. In this example, since the heating apparatus operated for 11 minutes (1 minute longer than the 10 minute threshold time period), the microprocessor 222 is configured to determine a new predetermined heating level by incrementing the prior heating level by 5 percent for each minute of operation above the threshold time period (e.g., 70 percent capacity).

Figure 5:
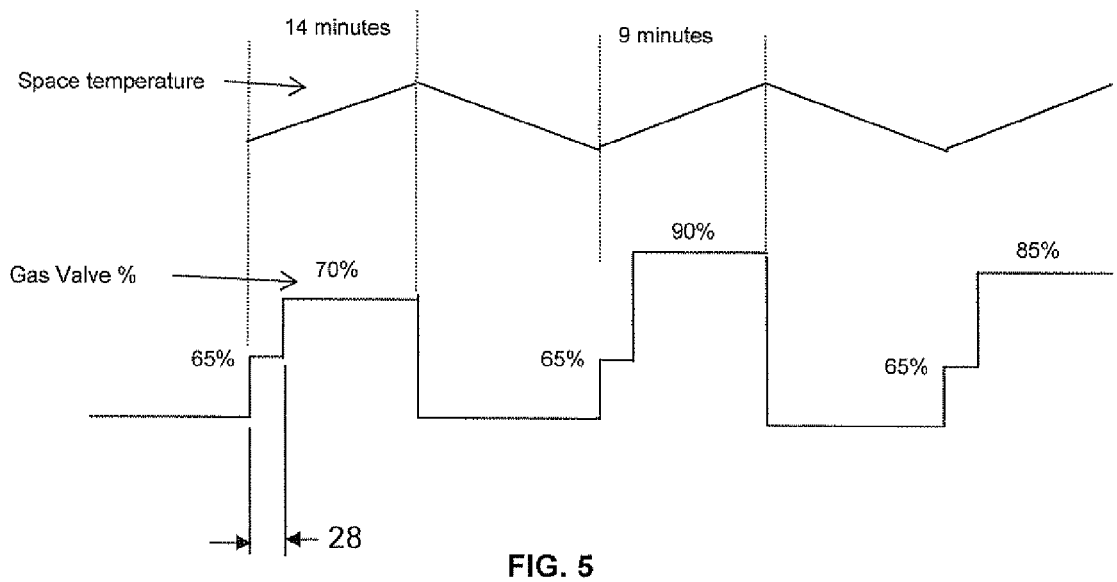
FIG. 5 shows a graph of the output of a variable rate gas valve and variable capacity heating apparatus, according to the present disclosure.

Referring to FIG. 5, a graph is shown of an example illustrating a number of heating cycles as controlled by the system or furnace controller 230 of FIG. 4. In this example of controller operation, the system or furnace controller 230 responds to a thermostat signal requesting heating by starting the variable capacity heating apparatus at a low heating capacity (e.g., 65 percent of heating capacity) and shortly thereafter generating a control signal to the variable rate gas valve to provide a predetermined heating level of 70 percent capacity (based on the capacity and duration of prior heating cycle, as in the above example). If the heating apparatus operated at 70 percent capacity in a heating cycle that lasted 14 minutes (4 minutes longer than the 10 minute threshold time period), the microprocessor 222 is configured to determine a new predetermined heating level as explained below.

In the above example, the microprocessor's encoded instruction are operable to store in an electronic memory the 14 minute duration of time in which the microprocessor 222 detects the presence of the thermostat signal requesting heating, and further operable to determine a predetermined heating level based on the stored time duration. Specifically, the microprocessor's encoded instruction is operable to increment the prior 70 percent heating level by 5 percent for each minute of operation over the 10 minute threshold time period, resulting in a 20 percent increase over the 70 percent capacity heating level. Thus, the next call for heat would result in the heating apparatus operating at a heating level that is at 90 percent capacity, as shown in FIG. 5.

The system or furnace controller 230 responds to a thermostat signal requesting heating by starting the variable capacity heating apparatus in a subsequent heating cycle shown in FIG. 5, at 90 percent of heating capacity lasting only 9 minutes (1 minute less than the preferred 10 minute threshold time period). The microprocessor's encoded instruction are operable to store in an electronic memory the 9 minute duration of time in which the presence of the thermostat signal requesting heating was detected, and further operable to determine a predetermined heating level based on the stored time duration. Specifically, the microprocessor's encoded instruction is operable to decrement the prior 90 percent heating level by 5 percent for each minute of operation less the 10 minute threshold time period, resulting in a 5 percent decrement from the 90% capacity heating level of the prior cycle. Thus, the next call for heat would result in the heating apparatus operating at 85 percent capacity.

As shown in FIG. 4, a system or furnace controller 230 is utilized in combination with a variable rate gas valve, which may be a stepper motor operated gas valve 100. The stepper-motor operated gas valve 100 is similar to that shown in FIG. 3, and includes a main diaphragm chamber 102, and a main diaphragm 104 disposed in the main diaphragm chamber 102. The main diaphragm 104 controllably displaces a valve 106 relative to a valve opening 108 in response to changes in pressure in the main diaphragm chamber 102, to thereby permit adjustment of the flow of fuel through the valve opening 108. The stepper-motor operated gas valve 100 further includes a servo-regulator diaphragm 110, which is configured to regulate fluid flow to the main diaphragm chamber 102r. The servo-regulator diaphragm 110 therefore controls the fluid pressure applied to the main diaphragm 104, to control the rate of fuel flow through the valve opening 108. The stepper-motor operated gas valve 100 also includes a stepper motor 120 configured to move in a stepwise manner to displace the servo-regulator diaphragm 110, for regulating fluid flow to the diaphragm chamber 102 to thereby regulate the rate of fuel flow through the valve 106. As previously stated, the stepper motor operated valve 100 preferably includes a third terminal 228, which is configured to receive a control signal input from the system or furnace controller 230, as described below.

In the second embodiment, the system or furnace controller 230 is configured to respond to the detection of a thermostat signal requesting heating by determining a predetermined heating level as described above, and further configured to generate a control signal for the variable rate gas valve. The control signal may comprise a modulating signal input, which may be a pulse width modulation (PWM) signal having an on-off duty-cycle/frequency corresponding to an operating capacity level for the predetermined heating level. Alternatively, the control signal may be in the form of a serial communication signal or a milliamp signal for controlling the stepper motor operated gas valve 100. The stepper motor operated valve 100 shown in FIG. 3 is configured to receive the control signal at the third terminal 228 (FIG. 4), and to determine the number of steps the stepper motor 120 must move to adjust the gas valve to a flow rate corresponding to the predetermined heating level. The stepper motor operated gas valve 100 directs the stepper motor to displace the servo-regulator diaphragm 110 and valve element to thereby establish a predetermined rate of fuel flow through the gas valve 100 that corresponds to the control signal from the system or furnace controller 230 (FIG. 4). In this manner, the system or furnace controller 230 is configured to generate a control signal corresponding to a predetermined heating rate, as determined according to the above described principles.

Accordingly, the second embodiment includes a system or furnace controller 230 for a variable heating system having a variable rate gas valve (such as a stepper motor operated gas valve 100 or modulating solenoid gas valve) for adjusting gas flow rate to vary the level of heating. The system or furnace controller 230 includes a first input terminal 224 configured to receive a thermostat signal requesting heating operation, and an electronic memory 232. The system or furnace controller 230 includes a microprocessor 222 in communication with the electronic memory 232 and first input terminal 224, which is configured to detect the presence of a thermostat signal requesting heating at the first input terminal 224 and to generate a control signal for the stepper motor operated gas valve 100. The microprocessor 222 includes a programmable read-only-memory that is encoded with an instruction to store in the electronic memory 232 a time duration during which the microprocessor 222 detects the presence of a thermostat signal requesting heating, and further encoded with an instruction operable to determine a predetermined heating level based on the stored time duration. For example, the microprocessor 222 may be configured to determine a new predetermined heating level by decrementing the heating level of the prior heating cycle by 5 percent for each minute of operation under the predetermined threshold time period. Similarly, the microprocessor 222 may be configured to increment the level of heating operation by a predetermined percentage for each minute that the heating apparatus operated beyond the threshold time period. The microprocessor 222 is configured to respond to the detection of a thermostat signal requesting heating by determining a signal value related to adjusting the variable rate gas valve (e.g., PWM signal having a duty cycle of on time versus on-off time of between 40% and 100% that is representative of capacity, or milliamp signal between 40 milliamps and 500 milliamps, for example) and generating a control signal to adjust the variable rate gas valve to establish a gas flow rate corresponding to the predetermined heating level. The system or furnace controller 230 may be configured to determine the signal value for adjusting the variable rate gas valve by selecting a value from a look-up table corresponding to the predetermined heating level.

Accordingly, the system or furnace controller 230 is configured to detect the presence of a thermostat signal at an input terminal 224 and configured to determine a predetermined heating level by incrementing or decrementing a prior heating level based on a stored duration of time in which the microprocessor 222 detected the presence of a thermostat signal at the input terminal 224 from a prior heating cycle. For example, the microprocessor 222 may be configured to determine a predetermined level of heating operation based on the following formula:

$$\% \text{ change to prior capacity} = (\text{prior on-time(min)} - \text{threshold on-time(min)}) \times 5\%$$

where the level of heating operation or gas valve rate of flow is determined as the previous level or flow rate plus the increment/decrement as determined above.

It should be noted that the microprocessor 222 may be configured to average two or more prior heating cycle time durations, and determine a new level of heating based on the average of two or more heating cycle time durations.

The system or furnace controller 230 may be connected to either a single-stage thermostat, or alternatively a two-stage thermostat. Where the thermostat is a two-stage thermostat, the system or furnace controller 230 may be further configured to increase the prior level of heating operation by 20 percent, if the system or furnace controller 230 detects a signal at the second terminal 226 from the two-stage thermostat requesting second-stage heating operation. Where the system or furnace controller 230 is connected to a two-stage thermostat via the second terminal 226, the microprocessor 222 may be configured to receive a second stage heating signal (from a two-stage thermostat requesting 100 percent heating capacity operation). The microprocessor 222 may be configured to increment the level of heating operation by a predetermined percentage whenever the microprocessor detects a thermostat signal requesting second stage heating operation. For example, where the heating apparatus has operated for a given time at first stage heating capacity, and the microprocessor 222 detects a thermostat signal requesting second stage heating operation, the microprocessor 222 may be configured to increment the prior level of heating by a predetermined percentage, such as 20 percent, for example.

Figure 6:
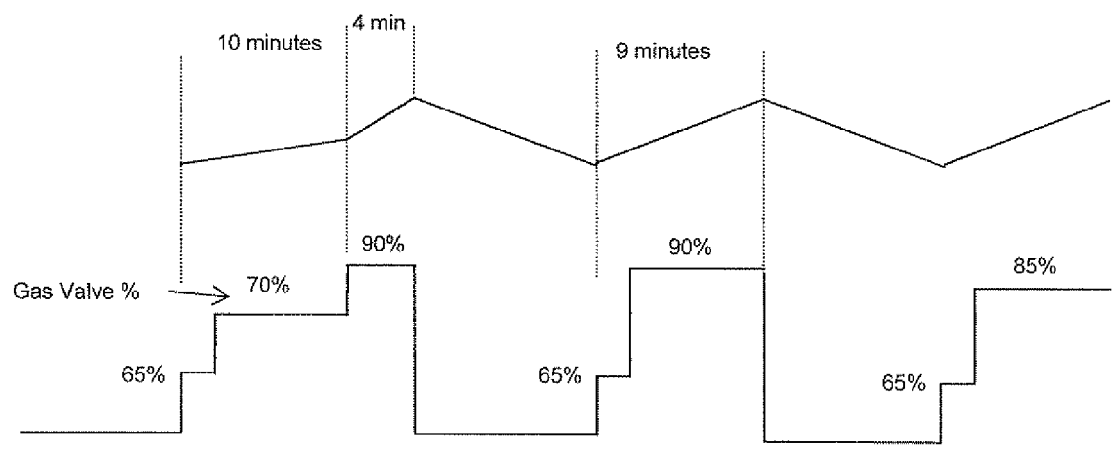
FIG. 6 shows a graph of the output of a variable rate gas valve and variable capacity heating apparatus, according to the present disclosure.

Referring to FIG. 6, a graph is shown of an example illustrating a number of heating cycles as controlled by the system or furnace controller 230 of FIG. 4, which is further configured to automatically increment the heating level after a predetermined time. In this example, the system or furnace controller 230 responds to a thermostat signal requesting heating by starting the variable capacity heating apparatus at a low heating capacity (e.g., 65 percent of heating capacity) and shortly thereafter generating a control signal to the variable rate gas valve to provide a predetermined heating level of 70 percent capacity (based on the capacity and duration of prior heating cycle, as in the above example). The microprocessor 222 may be further configured to automatically increment the level of heating operation during any active heating cycle in which the heating apparatus has operated for more than a predetermined threshold time period (such as the preferred threshold time period of 10 minutes, for example). As shown in FIG. 6, where the heating apparatus has operated at 70 percent operating capacity for a 10 minute time, the system or furnace controller 230 is configured to automatically increment the present level of heating by a predetermined percentage, such as 20 percent. Thus, the heating apparatus would operate at 90 percent operating capacity until the end of the heating cycle 4 minutes later (at which time the thermostat signal requesting heating is discontinued).

In view of the above described embodiments, systems and thermostats, the various controllers are configured such that each time the stepper-motor operated gas valve is opened, the microprocessor may incrementally move the stepper-motor to provide an initial low pressure supply of fuel and within a short interval thereafter move the stepper motor to adjust the supply of fuel corresponding to a predetermined heating level determined according to the above principles. It should be noted that the initial low heating level may be operated for a variable time period that is based on a duty cycle value indicative of heating load demand, or a default time period, as described in the first embodiment. Accordingly, the various embodiments of a controller for a stepper motor driven gas valve are configured to detect the presence of a signal at the first terminal (e.g., receive a signal from a thermostat via the first terminal requesting heating operation) and establish an initial heating level at the beginning of a heating cycle, and further configured to determine a predetermined heating level based on the duration of time in which a signal at the first terminal is present in at least one prior heating cycle.

It will be understood by those skilled in the art that the above variable capacity heating apparatus controller may be employed in various types of heating systems with any combination of the above disclosed features, without implementing the others. It will be understood that the stepper motor driven gas valve and controller described above may be utilized in other forms of heating and cooling equipment, including water heater and boiler appliances. Accordingly, it should be understood that the disclosed embodiments, and variations thereof, may be employed without departing from the scope of the invention.

What is claimed is:

1. A controller for a variable heating system having a variable rate gas valve configured to adjust a gas flow rate to vary the level of heating operation, the controller comprising:
   a first terminal configured to receive a thermostat signal requesting heating operation;
   an electronic memory; and
   a microprocessor in communication with the electronic memory and the first terminal, the microprocessor being configured to detect the presence of a thermostat signal requesting heating at the first terminal and to generate a control signal for the variable rate gas valve to operate the variable rate gas valve for establishing heating operation, the microprocessor including a programmable read-only-memory encoded with an instruction to store in the electronic memory a time duration during which the microprocessor detects the presence of a thermostat signal requesting heating, and further encoded with an instruction operable to determine a predetermined heating level based on the stored time duration, wherein the microprocessor is configured to respond to the detection of a thermostat signal requesting heating by determining the predetermined heating level, and generating a gas valve control signal corresponding to the predetermined heating level that is applied to the variable rate gas valve to adjust the variable rate gas valve to the gas flow rate corresponding to the predetermined heating level;

wherein the instruction is configured to determine a new predetermined heating level based on the following formula:

% change to prior capacity=(prior on-time(min)−
threshold on-time(min))×5%.

2. The controller of claim 1 wherein the microprocessor is configured to determine a control signal value for adjusting the variable rate gas valve by selecting a value from a look-up table corresponding to the predetermined heating level.

3. The controller of claim 1 further comprising a second terminal for receiving a signal for second stage heat operation from a two-stage thermostat connected to the second terminal, where upon receiving a signal via the second terminal, the microprocessor is configured to increment the level of heating operation by a predetermined amount.

4. A controller for a variable heating system having a variable rate gas valve configured to adjust a gas flow rate to vary the level of heating operation, the controller comprising:

a first terminal configured to receive a thermostat signal requesting heating operation;

an electronic memory; and a microprocessor in communication with the electronic memory and the first terminal, the microprocessor being configured to detect the presence of a thermostat signal requesting heating at the first terminal and to generate a control signal for the variable rate gas valve to operate the variable rate gas valve for establishing heating operation, the microprocessor including a programmable read-only-memory encoded with an instruction to store in the electronic memory a time duration during which the microprocessor detects the presence of a thermostat signal requesting heating, and further encoded with an instruction operable to determine a predetermined heating level based on the stored time duration, wherein the microprocessor is configured to respond to the detection of a thermostat signal requesting heating by determining the predetermined heating level, and generating a gas valve control signal corresponding to the predetermined heating level that is applied to the variable rate gas valve to adjust the variable rate gas valve to the gas flow rate corresponding to the predetermined heating level;

wherein the instruction is configured to determine a new predetermined heating level by decrementing the heating capacity level of the last heating cycle by a predetermined percentage for each minute the stored time duration of the signal requesting heating is less than a threshold time period.

5. The controller of claim 4, wherein the threshold time period is a time period in the range of between about 8 minutes and about 20 minutes.

6. The controller of claim 4, wherein the instruction is configured to determine a new predetermined heating level based on the following formula:

% change to prior capacity=(prior on-time(min)−
threshold on-time(min))×5%.

7. The controller of claim 6, wherein the threshold on time period is a time period of about 10 minutes.

8. A controller for a variable heating system having a variable rate gas valve configured to adjust a gas flow rate to vary the level of heating operation, the controller comprising:

a first terminal configured to receive a thermostat signal requesting heating operation;

an electronic memory; and a microprocessor in communication with the electronic memory and the first terminal, the microprocessor being configured to detect the presence of a thermostat signal requesting heating at the first terminal and to generate a control signal for the variable rate gas valve to operate the variable rate gas valve for establishing heating operation, the microprocessor including a programmable read-only-memory encoded with an instruction to store in the electronic memory a time duration during which the microprocessor detects the presence of a thermostat signal requesting heating, and further encoded with an instruction operable to determine a predetermined heating level based on the stored time duration, wherein the microprocessor is configured to respond to the detection of a thermostat signal requesting heating by determining the predetermined heating level, and generating a gas valve control signal corresponding to the predetermined heating level that is applied to the variable rate gas valve to adjust the variable rate gas valve to the gas flow rate corresponding to the predetermined heating level;

wherein the instruction is configured to determine a new predetermined heating level by incrementing the heating capacity level of the last heating cycle by a predetermined percentage for each minute the stored time duration of the signal requesting heating exceeds a threshold time period.

9. The controller of claim 8, wherein the threshold time period is a time period in the range of between about 8 minutes and about 20 minutes.

10. A controller for a variable heating system having a variable rate gas valve configured to adjust a gas flow rate to vary the level of heating operation, the controller comprising:

a first terminal configured to receive a thermostat signal requesting heating operation;

an electronic memory; and a microprocessor in communication with the electronic memory and the first terminal, the microprocessor being configured to detect the presence of a thermostat signal requesting heating at the first terminal and to generate a control signal for the variable rate gas valve to operate the variable rate gas valve for establishing heating operation, the microprocessor including a programmable read-only-memory encoded with an instruction to store in the electronic memory a time duration during which the microprocessor detects the presence of a thermostat signal requesting heating, and further encoded with an instruction operable to determine a predetermined heating level based on the stored time duration, by decrementing the heating capacity level of the last heating cycle by a predetermined percentage for each minute that the stored time duration is less than a threshold time period, or by incrementing the heating capacity level of the last heating cycle by a predetermined percentage for each minute that the stored time duration exceeds a threshold time period, wherein the microprocessor is configured to respond to the detection of a thermostat signal requesting heating by determining the predetermined heating level, and generating a gas valve control signal corresponding to the predetermined heating level that is applied to the variable rate gas valve to adjust the variable rate gas valve to the gas flow rate corresponding to the predetermined heating level.

11. The controller of claim 10, wherein the threshold time period is a time period in the range of between about 8 minutes and about 20 minutes.

12. The controller of claim 10, wherein the instruction is configured to determine a new predetermined heating level based on the following formula:

% change to prior capacity=(prior on-time(min)−threshold on-time(min))×5%.

13. The controller of claim 12, wherein the threshold on time period is a time period of about 10 minutes.

14. The controller of claim 10 wherein the microprocessor is configured to determine a control signal value for adjusting the variable rate gas valve by selecting a value from a look-up table corresponding to the predetermined heating level.

15. The controller of claim 14 wherein the signal value related to adjusting the variable rate gas valve is a pulse width modulated signal having a duty cycle in the range of between 40 percent and 100 percent.

16. The controller of claim 14 wherein the signal value is a milliamp signal in the range of between about 40 milliamps and about 500 milliamps.

17. The controller of claim 10, wherein the control signal is a serial communication signal.

18. The controller of claim 10, wherein the variable rate gas valve is a stepper motor operated gas valve.

19. The controller of claim 18, wherein the microprocessor is configured to determine the number of steps the stepper motor must move by selecting a motor step value from a look-up table corresponding to the predetermined heating level.

20. The controller of claim 10 further comprising a second terminal for receiving a signal for second stage heat operation from a two-stage thermostat connected to the second terminal, where upon receiving a signal via the second terminal, the microprocessor is configured to increment the level of heating operation by a predetermined amount.

21. The controller of claim 10 in combination with a stepper-motor operated gas valve configured to vary the gas flow rate for varying the level of heating operation, the controller and stepper-motor operated gas valve combination comprising:

a valve element movable relative to a valve opening in the gas valve;

a main diaphragm chamber disposed in the gas valve, a main diaphragm disposed in the main diaphragm chamber and coupled to the valve element, the main diaphragm being configured to controllably displace the valve element relative to the valve opening in response to changes in gas pressure acting against the main diaphragm;

a servo-regulator diaphragm configured to regulate flow of gas to the main diaphragm chamber that acts against the main diaphragm, to thereby adjust the valve element to vary the flow rate of gas through the valve opening;

a stepper motor configured to move in a stepwise manner to displace the servo-regulator diaphragm for varying the flow of gas to the diaphragm chamber, to thereby control the rate of gas flow through the valve opening;

a first terminal disposed on the gas valve configured to receive a control signal corresponding to a desired gas flow rate for establishing a desired level of heating operation;

the first terminal configured to receive a thermostat signal requesting heating operation is on the controller;

the microprocessor being configured to generate a control signal for the stepper motor operated gas valve to displace the servo-regulator diaphragm to establish gas flow for establishing heating operation, wherein the microprocessor is configured to respond to the detection of a thermostat signal requesting heating by determining the number of steps the stepper motor must move to displace the servo-regulator diaphragm and vary the gas flow rate corresponding to the desired heating level, and to generate a control signal corresponding to the determined number of steps for the stepper motor to adjust the servo-regulator diaphragm and vary the gas flow rate corresponding to the desired heating level.

\* \* \* \* \*